United States Patent
Ramachandra et al.

(10) Patent No.: US 9,582,888 B2
(45) Date of Patent: Feb. 28, 2017

(54) STRUCTURED LIGHT THREE-DIMENSIONAL (3D) DEPTH MAP BASED ON CONTENT FILTERING

(71) Applicant: QUALCOMM Incorporated, San Diego, CA (US)

(72) Inventors: Vikas Ramachandra, San Diego, CA (US); Kalin Mitkov Atanassov, San Diego, CA (US); James Wilson Nash, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/743,980

(22) Filed: Jun. 18, 2015

(65) Prior Publication Data
US 2015/0371393 A1    Dec. 24, 2015

Related U.S. Application Data

(60) Provisional application No. 62/014,652, filed on Jun. 19, 2014.

(51) Int. Cl.
*G06K 9/00* (2006.01)
*G06T 7/00* (2006.01)
(Continued)

(52) U.S. Cl.
CPC ........ *G06T 7/0055* (2013.01); *G06K 9/00375* (2013.01); *G06K 9/2036* (2013.01);
(Continued)

(58) Field of Classification Search
None
See application file for complete search history.

(56) References Cited

U.S. PATENT DOCUMENTS 7,075,661 B2  7/2006 Petty et al.
7,440,590 B1 * 10/2008 Hassebrook ....... G01B 11/2513
                                                   345/582

(Continued)

OTHER PUBLICATIONS

Braumann U-D., et al., "Three-Dimensional Reconstruction and Quantification of Cervical Carcinoma Invasion Fronts From Histological Serial Sections", IEEE Transactions on Medical Imaging, IEEE Service Center, Piscataway, NJ, US, vol. 24, No. 10, Oct. 1, 2005 (Oct. 1, 2005), pp. 1286-1307, XP011139970, ISSN: 0278-0062, DOI:10-1109/TMI.2005.855437.

(Continued)

*Primary Examiner* — Chan Park
*Assistant Examiner* — Elisa Rice
(74) *Attorney, Agent, or Firm* — Toler Law Group, PC

(57) ABSTRACT

A structured light three-dimensional (3D) depth map based on content filtering is disclosed. In a particular embodiment, a method includes receiving, at a receiver device, image data that corresponds to a structured light image. The method further includes processing the image data to decode depth information based on a pattern of projected coded light. The depth information corresponds to a depth map. The method also includes performing one or more filtering operations on the image data. An output of the one or more filtering operations includes filtered image data. The method further includes performing a comparison of the depth information to the filtered image data and modifying the depth information based on the comparison to generate a modified depth map.

30 Claims, 8 Drawing Sheets

(51) Int. Cl.
*G06T 5/00* (2006.01)
*G06T 5/10* (2006.01)
*G06K 9/20* (2006.01)
*H04N 13/02* (2006.01)

(52) U.S. Cl.
CPC ............... *G06T 5/002* (2013.01); *G06T 5/10* (2013.01); *G06T 7/514* (2017.01); *H04N 13/0271* (2013.01); *G06T 2207/10012* (2013.01); *G06T 2207/10028* (2013.01)

(56) References Cited

U.S. PATENT DOCUMENTS

| | | | |
|---|---|---|---|
| 8,262,229 B2* | 9/2012 | Nelson | H04N 9/3147 353/121 |
| 2006/0104535 A1* | 5/2006 | Varekamp | G06T 7/0022 382/260 |
| 2007/0167837 A1* | 7/2007 | Moyer | A61B 5/0064 600/476 |
| 2008/0152192 A1* | 6/2008 | Zhu | G06K 9/00771 382/103 |
| 2009/0245614 A1* | 10/2009 | Baldwin | G01B 11/245 382/141 |
| 2010/0080448 A1* | 4/2010 | Tam | G06T 7/0051 382/154 |
| 2012/0316820 A1 | 12/2012 | Nakazato et al. | |
| 2012/0327430 A1 | 12/2012 | Lee et al. | |
| 2013/0038600 A1* | 2/2013 | Wang | H04N 19/597 345/419 |
| 2013/0301908 A1 | 11/2013 | Shim et al. | |
| 2013/0314696 A1 | 11/2013 | Atanassov et al. | |
| 2013/0315354 A1 | 11/2013 | Atanassov et al. | |
| 2013/0315501 A1* | 11/2013 | Atanassov | G06T 5/001 382/275 |
| 2013/0329018 A1 | 12/2013 | Gordon et al. | |
| 2014/0079336 A1* | 3/2014 | Venkataraman | G06T 5/005 382/275 |

OTHER PUBLICATIONS

International Search Report and Written Opinion—PCT/US2015/036681—ISA/EPO—Sep. 8, 2015, 15 pages.
Ramachandra V., et al., "Structured Light 3D Depth Map Enhancement and Gesture Recognition Using Image Content Adaptive Filtering", Proceedings of Spie, SPIE—International Society for Optical Engineering, US, vol. 9020, 978-1-62841-684-8.
Sarra S.A., "Digital Total Variation Filtering as Postprocessing for Chebyshev Pseudospectral Methods for Conservation Laws", Numerical Algorithms, Kluwer Academic Publishers, Do, vol. 41, No. 1, Jan. 1, 2006 (Jan. 1, 2006), pp. 17-33, XP019290082, ISSN: 1572-9265.
Varghees V.N., et al., "Automated PCG Signal Delineation Method for Heart Sound Analysis", 2014 Twentieth National Conference on Communications (NCC), IEEE, Feb. 28, 2014 (Feb. 28, 2014), pp. 1-6, XP032593005, DOI: 10.1109/NCC.2014.6811340 [retrieved on May 7, 2014].

* cited by examiner

Structured Light Image

Representative Depth Map Image
(different colors indicate different depths)

Representative Filtered Image

Representative Intermediate Depth Map Image
(red color indicates incorrect depth data)

Representative Modified Depth Map Image

US 9,582,888 B2

STRUCTURED LIGHT THREE-DIMENSIONAL (3D) DEPTH MAP BASED ON CONTENT FILTERING

I. CLAIM OF PRIORITY

The present application claims priority from U.S. Provisional Patent Application No. 62/014,652, entitled "STRUCTURED LIGHT THREE-DIMENSIONAL (3D) DEPTH MAP BASED ON CONTENT FILTERING," filed Jun. 19, 2014, the contents of which are incorporated by reference in their entirety.

II. FIELD

The present disclosure is generally related to a structured light three-dimensional (3D) depth map based on content filtering.

III. DESCRIPTION OF RELATED ART

Advances in technology have resulted in smaller apparatuses and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless devices, such as wireless telephones, may be configured to generate three-dimensional (3D) depth maps. For example, a wireless device may include or may be associated with a structured light system for depth estimation configured to project an illumination pattern (e.g., a mask having vertical stripes) on a scene including a three-dimensional (3D) object. The illumination pattern on the scene or on the 3D object typically encodes depth information for the scene or the 3D object. The structured light system may also be configured to capture an image of the illuminated scene. Based on patterns captured in an image of the scene, a depth map may be generated that indicates different depths in the scene. However, the depth map may include one or more erroneous depth values based on false positives (e.g., detecting and decoding valid depth data where there is no object), false negatives (e.g., missing depth values based on shadow regions of the image where a pattern of projected coded light is not detected in the image), and/or decoding errors (e.g., incorrectly decoding a pattern of projected light reflected off of a human body and/or decoding errors generated during processing of an image).

IV. SUMMARY

In an illustrative example, a method includes receiving, at a receiver device, image data that corresponds to a structured light image. The method further includes processing the image data to decode depth information based on a pattern of projected coded light. The depth information corresponds to a depth map. The method also includes performing one or more filtering operations on the image data. An output of the one or more filtering operations includes filtered image data. The method further includes performing a comparison between the depth information and the filtered image data and modifying the depth information based on the comparison to generate a modified depth map.

In another illustrative example, a device includes a processor configured to process image data that corresponds to a structured light image to decode depth information based on a pattern of projected coded light. The processor is further configured to perform a filtering operation on the image data to generate filtered image data. The processor is configured to modify the depth information based on a comparison between the depth information and the filtered image data. The device also includes a memory configured to store the modified depth information.

In another illustrative example, an apparatus includes means for decoding depth information based on image data that corresponds to a structured light image and based on a pattern of projected coded light. The apparatus further includes means for performing one or more filtering operations on the image data to generate filtered image data. The apparatus further includes means for modifying the depth information based on a comparison between the depth information and the filtered image data.

In another illustrative example, a non-transitory computer-readable medium storing instructions that are executable by a processor to cause the processor to perform operations including processing image data corresponding to a structured light image to decode depth information based on a pattern of projected coded light. The instructions further cause the processor to perform operations including performing one or more filtering operations on the image data to generate filtered image data. The instructions further cause the processor to perform operations including modifying the depth information based on a comparison between the depth information and the filtered image data.

Other aspects, advantages, and features of the present disclosure will become apparent after review of the entire application, including the following sections: Brief Description of the Drawings, Detailed Description, and the claimss.

V. BRIEF DESCRIPTION OF THE DRAWINGS

VI. DETAILED DESCRIPTION

Particular aspects of the present disclosure are described below with reference to the drawings. In the description, common features are designated by common reference numbers throughout the drawings.

A device, such as a mobile device, may be configured to generate a structured light three-dimensional (3D) depth map based on content filtering. The device may receive an image, such as a structured light image, that includes pixel intensity values based on a pattern of projected coded light. The device may process the image to decode depth information based on the pattern and to generate a depth map (e.g., depth values). The device may also process the image to generate filtered image data, such as a segmentation map. For example, the filtered image data may be generated by filtering the image, such as by applying a blurring filter, a low pass filter, a band pass filter, and/or a total variation filter. To illustrate, one or more filtering operations may be applied to the image to reduce or eliminate a presence of the pattern of projected coded light included in the image. The depth map may be compared to the filtered image data to identify missing and/or incorrect depth values associated with the depth map. The depth map (e.g., the depth values) may be modified based on the comparison between the filtered image data and the depth map to generate depth values for the missing depth values and/or to correct incorrect depth values.

One particular advantage provided by at least one of the disclosed aspects is that by generating the filtered image data and comparing the filtered image data to the depth information, missing and/or incorrect depth values associated with depth information may be identified and corrected. For example, the missing and/or incorrect depth values may be based on false positives, false negatives, and/or decoding errors. By correcting the missing and/or incorrect depth values, the depth information may be modified (e.g., corrected). Correcting the missing and/or incorrect depth value may enable improved processing of the modified depth information (e.g., corresponding to a depth map) by other applications, such as an object detection application.

Figure 1:
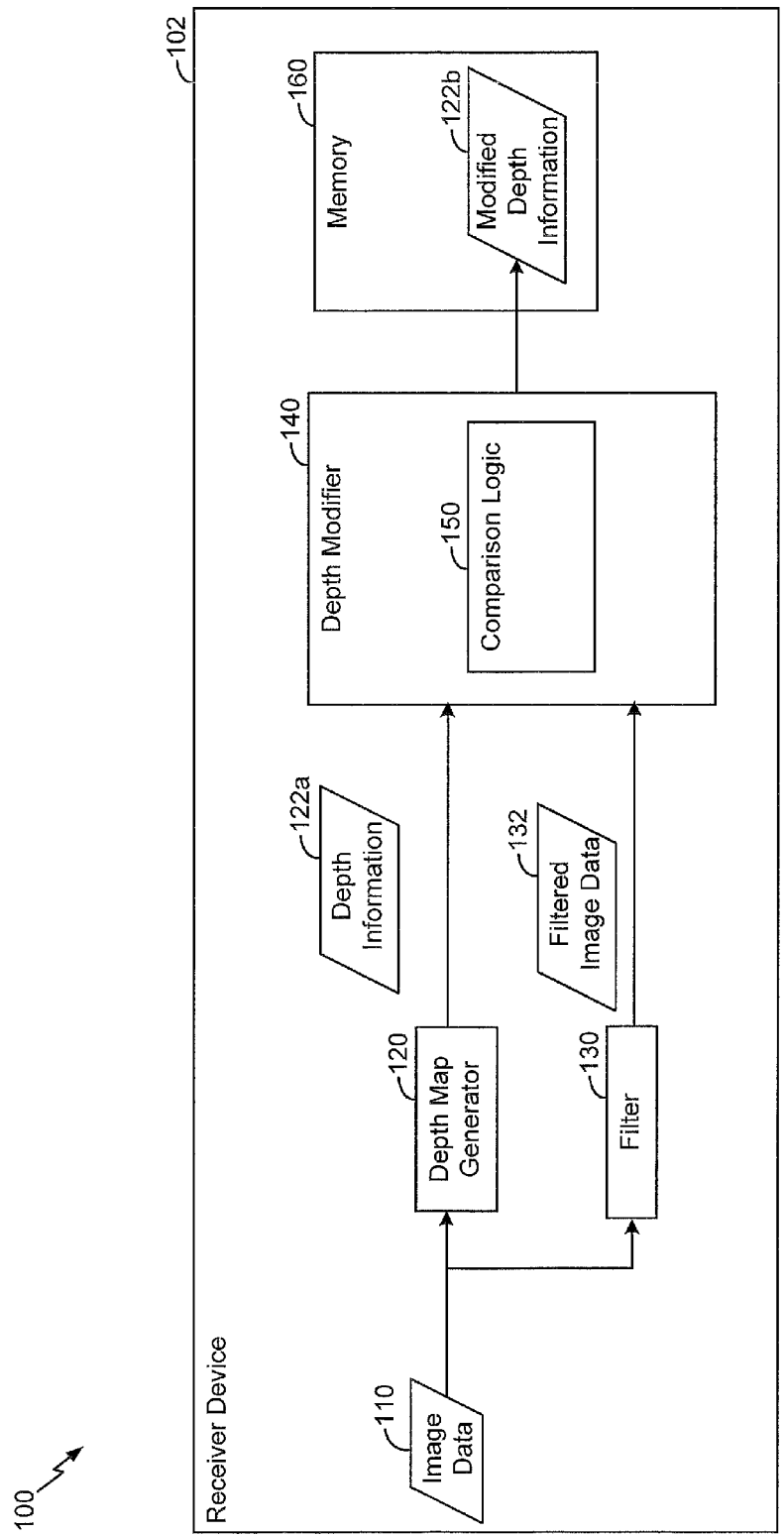
FIG. 1 is a block diagram of a receiver device of a structured light system.

Referring to FIG. 1, an illustrative example of a receiver device 102 of a structured light system 100 is shown. The structured light system 100 may include a transmitter device (not shown) and the receiver device 102. The structured light system 100 may be included and/or embedded in one or more devices, such as an electronic device. In a particular implementation, the electronic device (e.g., the receiver device 102) may be a mobile device that includes an image sensor, such as a camera, configured to capture an image. For example, the electronic device may capture an image and may generate corresponding image data 110.

The receiver device 102 may be configured to generate or receive the image data 110. The image data 110 may correspond to an image that includes a reflected code mask. For example, a transmitter device (not shown) may project a code mask that includes one or more codewords onto an object or a scene. Each codeword may have a corresponding pattern of structured light and be positioned at a known location within the code mask. A reflection of the code mask off of the object or scene may be captured as an image by a receiver sensor, such as a camera. A shift of the code mask (e.g., of one or more codewords) in the reflected code mask as compared to the projected code mask may "encode" (e.g., be used to determine) depth information and/or shape information associated with the object or scene that reflected the projected code mask, as described further herein. The image may include or correspond to a plurality of pixels, where each pixel has a corresponding pixel intensity value. The pixel intensity values may be included in the image data 110 and provided to the receiver device 102. In some implementations, the receiver device 102 may include a receiver sensor that captures the image and generates the image data 110 based on the image. The receiver device 102 and/or the receiver sensor may be aware of (e.g., "know") the code mask projected by the transmitter device and, thus, a location of one or more codewords included in the projected code mask.

The receiver device 102 may include a depth map generator 120, a filter 130, a depth modifier 140, and a memory 160. The image data 110 received by the receiver device 102 may be provided to the depth map generator 120 and to the filter 130. The image data 110 may also be provided to and stored at the memory 106.

The depth map generator 120 may be configured to generate depth information 122a based on the image data 110. For example, the depth map generator 120 may process the image data 110 to identify one or more codewords included in the image data 110 (e.g., the image). For example, a particular codeword may include a particular pattern of structured light that corresponds to a particular grouping of pixel intensity values. The depth map generator 120 may identify the particular grouping of pixel intensity values included in the image data 110 and determine a location of the image that corresponds to the grouping of pixel intensity values (e.g., a location of the codeword in the image of the reflected code mask).

For each detected codeword, the depth map generator 120 may compare a determined location of the codeword to an original location of the codeword in the projected code mask. For example, the depth map generator 120 may determine a displacement (e.g., a distance) of the codeword in the projected code mask as compared to the codeword in the received reflection of the projected code mask. Based on the displacement, the depth map generator 120 may use one or more techniques, such as triangulation techniques and/or stereoscopic image processing techniques, to determine one or more depth values corresponding to the codeword. Thus, the difference between the received codeword position and transmitted codeword position may be used to determine a depth (e.g., a depth value) of a particular object (or a portion thereof). To illustrate, each depth value determined for the codeword may be associated with and/or correspond to a different pixel intensity value included in the particular grouping of pixel intensity values. Accordingly, each depth value may correspond to a different pixel location of the plurality of pixels that correspond to the image. Thus, the depth map generator 120 may generate depth information 122a that includes a depth value for one or more pixels of the image based on reflected codewords (e.g., for one or more pixel intensity values included in the image data 110). The depth information 122a may correspond to a depth map that indicates one or more depth values associated with an object or scene in the image.

The depth information 122a may include incorrect depth data, such as one or more incorrect depth values. The incorrect depth values may be based on false positives, false negatives, decoding errors, or a combination thereof. A false positive may be associated with detecting and decoding depth data where there is no object included in the image. A false negative may be associated with missing depth values based on shadow regions of the image where a pattern of projected coded light (e.g., a codeword) is not detected in the image. A decoding error may be associated with incorrectly decoding a pattern of projected light reflected off of an object, such as a human body, and/or decoding errors generated during processing of an image, such as decoding errors generated by the depth map generator 120 during processing of the image data 110.

The filter 130 may be configured to receive the image data 110 and to generate filtered image data 132. The filtered image data 132 may include a filtered intensity data value for each pixel intensity value included in the image data 110 (e.g., a filtered intensity value for each pixel corresponding to the image). For example, the filter 130 may perform one or more filtering operations on the image data 110 to generate the filtered image data 132. The one or more filtering operations may include a blurring filtering operation, a low pass filtering operation, a band pass filtering operation, and/or a total variation filtering operation, as illustrative, non-limiting examples. The one or more filtering operations may be configured to reduce or eliminate components of the image data 110 corresponding to the pattern of projected light. By filtering out the components of the image data 110 corresponding to the pattern of projected light, the filter 130 may generate a filtered image that is representative of the object or scene included in a field of view of an image capture device. In some implementations, the one or more filtering operations may be used to identify groups of pixel intensity values that correspond to portions of the image with similar reflectivity, such as one or more objects with similar reflectivity that are included in the image. For example, the filter 130 may perform one or more iterations of the one or more filtering operations on the image data 110 to generate the filtered image data 132.

The filtered image data 132 may include the same number of filtered image data values as the number of pixel intensity values in the image data 110 and the number of depth values in the depth information 122a. To illustrate, each of the pixel intensity values included in the image data 110 may correspond to a pixel associated with the image. The depth map generator 120 may process the image data 110 to generate a depth value for each pixel intensity value included in the image data 110, such that each depth value corresponds to different pixel of the image. Additionally, the filter 130 may process the image data 110 to generate a filtered image data value for each pixel intensity value included in the image data 110, such that each filtered image data value corresponds to a different pixel of the image.

The depth modifier 140 may be configured to receive the depth information 122a and the filtered image data 132. The depth modifier 140 may include comparison logic 150. The comparison logic 150 may be configured to compare the depth information 122a (corresponding to a depth map of the image) and the filtered image data 132 (corresponding to a filtered version of the image). For example, the comparison logic 150 may be configured to perform a pixel by pixel comparison between the depth information 122a and the filtered image data 132.

Based on a comparison of the depth information 122a and the filtered image data 132, the comparison logic 150 may identify valid depth data and/or invalid depth data (e.g., incorrect depth data) included in the depth information 122a. For example, the comparison logic 150 may identify a depth value included in the depth information 122a as valid when a depth data value (corresponding to a pixel location of the image) and a filtered image data value (corresponding to the same pixel location of the image) both indicate that an object is present at the pixel location or both indicate that an object is not present at the pixel location. As another example, the comparison logic 150 may identify a depth value included in the depth information 122a as invalid (e.g., incorrect depth data) when a depth data value (corresponding to a pixel location of the image) and a filtered image data value (corresponding to the same pixel location of the image) provide differing indications of whether an object is present at the pixel location.

Depth values identified as invalid (e.g., incorrect depth data) may include or correspond to an incorrect depth value and/or a missing depth value. An invalid depth value may be identified when a depth data value (corresponding to a pixel location of the image) indicates that an object is present at the pixel location and a filtered image data value (corresponding to the pixel location of the image) does not indicate that an object is present at the pixel location. A missing depth value may be identified when a depth data value (corresponding to a pixel location of the image) does not indicate that an object is present at the pixel location and a filtered image data value (corresponding to the pixel location of the image) indicates that an object is present at the pixel location.

The depth modifier 140 may be configured to modify one or more of the depth data values included in the depth information 122a that are identified by the comparison logic 150 as invalid (incorrect) depth data. For example, the depth modifier 140 may identify an invalid depth value and modify (e.g., change) the invalid depth value (that indicates an object is present at a pixel location) to instead indicate that the object is not present at the pixel location.

As another example, the depth modifier 140 may identify a missing depth value and modify (e.g., change) the missing depth value (that indicates an object is not present at a pixel location) to instead indicate that the object is present at the pixel location. The depth modifier 140 may modify the missing depth value based on the filtered image data 132. To illustrate, the depth modifier 140 may identify a particular pixel of the image that corresponds to the missing depth value. The depth modifier 140 may identify a particular filtered image data value (included in the filtered image data 132) that corresponds to the particular pixel. Based on the filtered image data value, the depth modifier 140 may identify one or more pixels of the image that are near the particular pixel (e.g., within a threshold distance from the particular pixel). Each of the one or more pixels may correspond to a filtered image data value is similar to the particular filtered image data value and may correspond to depth data identified as valid. The depth modifier 140 may determine a particular depth value based on the one or more pixels and may modify (e.g., set) the missing depth value to the particular depth value. For example, for each of the one or more pixels, the depth modifier 140 may determine a corresponding depth value included in the depth information 122 and may generate the particular depth value as a median value of the depth values that correspond to the one or more pixels.

After modifying (e.g., correcting) the depth information 122a, the depth modifier 140 may output a corrected version of the depth information 122a as modified depth information 122b. The modified depth information 122b may more accurate than the depth information 122a. The modified depth information 122b may correspond to a depth map (of the image) that includes depth values of one or more objects included in the image. The depth modifier 140 may send the modified depth information 122b to the memory 160. The memory 160 may be configured to receive modified depth information 122b from the depth modifier 140 and to store the modified depth information 122b.

During operation of the structured light system 100, the receiver device 102 may generate or receive the image data 110 and provide the image data 110 to the depth map generator 120 and to the filter 130. The image data 110 may be received from an image capture sensor that is configured to capture the image, such as an image capture sensor included in the receiver device 102. The image data 110 may correspond to an image that has "encoded" depth information based on reflection of a projected code mask. For example, the projected code mask may be associated with one or more patterns of structured light (e.g., one or more codewords) that enable the receiver device 102 to determine a depth of an object that reflects the one or more patterns.

The receiver device 102 (e.g., the depth map generator 120) may process the image data 110 to generate the depth information 122a. For example, the depth map generator 120 may process the image data 110 to decode depth information included in the image based on a pattern of projected coded light (e.g., a codeword). The depth information 122a may correspond to a depth map associated with the image. Additionally, the receiver device 102 (e.g., the filter 130) may process the image data 110 to generate the filtered image data 132. For example, a blurring filter, a total variation filter, or a combination thereof may be applied to filter the image data 110 to generate the filtered image data. The filtered image data may be associated with regions (or objects) within the image that have similar reflectivity. In some implementations, the filtered image data 132 may be associated with a segmentation map of the image.

A comparison may be performed between the depth information 122a and the filtered image data 132 to identify incorrect depth data (e.g., an incorrect depth value and/or a missing depth value) included in the depth information 122s. For example, the comparison may correspond to a pixel by pixel comparison between the depth information 122a and the filtered image data 132. The receiver device 102 may modify (e.g., correct) the incorrect depth data to generate the modified depth information 122b.

Although the depth map generator 120, the filter 130, and the depth modifier 140 are illustrated as separate components, one or more of the depth map generator 120, the filter 130, and the depth modifier 140 may be included in a single component. Although the comparison logic 150 is depicted as being included in the depth modifier 140, in other implementations the comparison logic 150 may be separate from the depth modifier 140. Each of the depth map generator 120, the filter 130, the depth modifier 140, and/or the comparison logic 150 may be embodied in one or more hardware components, software, or a combination thereof In a particular implementation, the depth modifier 140 identifies a particular pixel location of the depth map that corresponds to the incorrect depth data. The depth modifier 140 may determine, based on the filtered image data 132, a particular filtered image data value that corresponds to the particular pixel location and may select an area associated with the image (e.g., the depth map) based on the particular pixel location. The area may be associated with a plurality of pixel locations that includes the particular pixel location. The receiver device 102 may identify a set of one or more pixels locations of the plurality of pixel locations and determine a particular depth value based on depth data that corresponds to the set of one or more pixel locations. The receiver device 102 may update the incorrect depth data corresponding to the particular pixel location based on the particular depth value to generate the modified depth information 122b.

By processing the image data 110 using two different components (e.g., the depth map generator 120 and the filter 130), the receiver device 102 may generate two sets of data, such as the depth information 122a and the filtered image data 132, based on a single set of data (i.e., the image data 110) captured by a single image capture device of the receiver device 102. Additionally, by generating the filtered image data 132 and comparing the filtered image data 132 to the depth information 122a, missing and/or incorrect depth values associated with depth information 122a may be identified and corrected. For example, the missing and/or incorrect depth values may be based on false positives, false negatives, and/or decoding errors. By correcting the missing and/or incorrect depth values, the depth information 122a may be modified (e.g., corrected). Correcting the missing and/or incorrect depth value may enable improved processing of the modified depth information 122b (e.g., corresponding to a depth map) by other applications, such as an object detection application.

Figure 2:
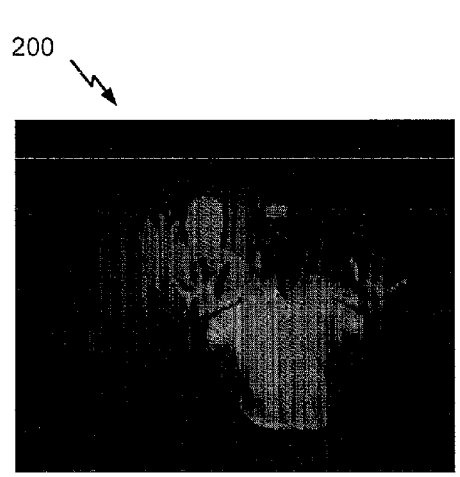
FIG. 2 is a diagram to illustrate processing stages performed by the receiver device of FIG. 1.
Figure 2:
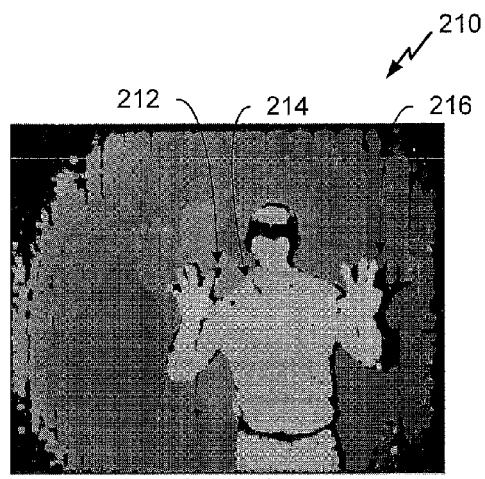
Figure 2:
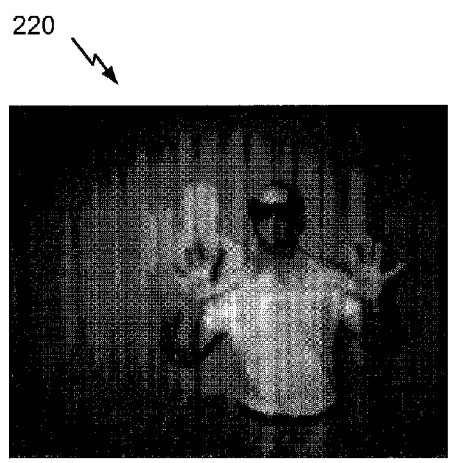
Figure 2:
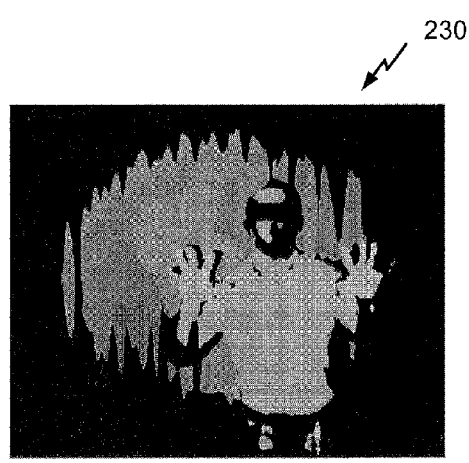
Figure 2:
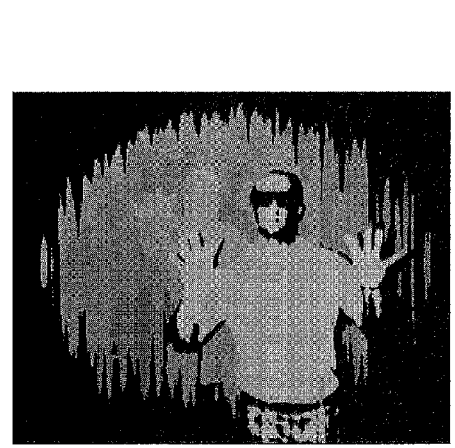

Referring to FIG. 2, illustrative examples to illustrate processing stages performed by the receiver device 102 of FIG. 1 are depicted. An example of a structured light image is depicted and generally designated 200. The structured light image may include or correspond to the image data 110 received by the receiver device 102 and provided to the depth map generator 120 and the filter 130 of FIG. 1. The structured light image 200 may be generated by a camera that detects structured light (e.g., coded light corresponding to vertical stripes) projected onto and reflected off of a 3D object.

An example of a representative depth map image is depicted and generally designated 210. In the depth map image 210, different colors indicate different depths. The depth map image 210 may correspond to the depth information 122a of FIG. 1. The depth map image 210 may include the same number of pixels as the structured light image 200 and each pixel may have a corresponding depth data value. The depth map image 210 may be based on the structured light image 200. For example, the light patterns (e.g., reflections of the code mask) of the structured light image 200 may be decoded to generate the depth map image 210. For example, the structured light image 200 may be representative of the depth information 122a generated by the depth map generator 120 after processing the image data 110.

The depth map image 210 includes one or more incorrect depth values, such as first incorrect values 212, second incorrect values 214, and third incorrect values 216. The first incorrect values 212 may correspond to false positives (e.g., depth data where none should exist) caused by shadow regions of one or more objects in the structured light image 200. The second incorrect values 214 may correspond to missing depth values that are based on improperly decoded data (e.g., decoding errors). The third incorrect values 216 may correspond to missing depth values based on false negatives (e.g., no depth data where there should be depth data).

An example of a representative filtered image is depicted and generally designated 220. The filtered image 220 may correspond to the filtered image data 132 of FIG. 1. The filtered image 220 may include the same number of pixels as the structured light image 200 and each pixel may have a corresponding filtered image data value. The filtered image 220 may be based on the structured light image 200. For example, the structured light image 200 may be processed (e.g., filtered, such as by using a blurring filter and/or a total variation filter) to identify portions of the image with similar reflectivity to generate the filtered image 220. The processing may not blur regions of the image across edge regions. Accordingly, the filtered image 220 may identify consolidated portions of the structured light image 200 that have similar reflectivity.

An example of a representative intermediate depth map image is depicted and generally designated 230. The intermediate depth map image 230 may include the same number of pixels as the structured light image 200. In the intermediate depth map image 230, different colors indicate different depths but do not directly correspond to the colors included in the depth map image 210. In the intermediate depth map image 230, the red color indicates incorrect depth data identified in the depth map image 210, as described further herein.

The intermediate depth map image 230 may correspond to a comparison between the depth map image 210 and the filtered image 220 to identify incorrect depth data. For example, the comparison may include or correspond to the comparison performed by the comparison logic 150 to compare the depth information 122a and the filtered image data 132. For example, a pixel by pixel comparison between the depth map image 210 and the filtered image 220 may be performed to identify invalid depth data values (e.g., erroneous values based on shadows). To illustrate, the depth map image 210 may indicate a first pixel (corresponding to the first incorrect values 212) has a first depth value. However, the first pixel may have a very low reflectivity value in the filtered image 220 that indicates there is no object at a location of the first pixel. Accordingly, the first depth value may be identified as invalid. The first depth value may be corrected to indicate that there is no object present as illustrated in the intermediate depth map image 230.

Additionally or alternatively, the pixel by pixel comparison may identify missing depth data values. To illustrate, the depth map image 210 may indicate a second pixel (corresponding to the third incorrect values 216) has no depth value, but the filtered image 220 may indicate a reflective object is present at a location of the second pixel. Accordingly, a portion of the depth map image 210 may be identified as having missing depth data (as indicated by the red color in the intermediate depth map image 230). Thus, based on the pixel by pixel comparison, invalid depth values may be corrected and missing depth values may be identified. Accordingly, the intermediate depth map image 230 depicts a version of the depth map image 210 after correction of invalid depth data and after identification of missing depth data (illustrated as the maroon regions).

An example, of a modified depth map image is depicted and generally designated 240. The modified depth map image 240 image may correspond to the modified depth information 122b of FIG. 1. The modified depth map image 240 may include the same number of pixels as the structured light image 200. In the modified depth map image 240, different colors indicate different depths but do not directly correspond to the colors included in the depth map image 210 or to the intermediate depth map image 230.

In the modified depth map image 240, missing depth values identified based on the pixel by pixel comparison may be populated and included in the depth map. For example, depth information corresponding to the depth map image 210 and/or the intermediate depth map image 230 may be modified to include the missing depth values. To populate a particular missing depth value corresponding to a particular pixel of the depth map image 210 (or the intermediate depth map image 230), a window may be set in the depth map image 210 around the particular pixel and one or more pixels within the window may be identified that have valid depth data (e.g., one or more pixels that are not missing depth data). For each of the one or more pixels within the window having valid depth data, a corresponding reflective value (based on the filtered image 220) may be determined. A set of the one or more pixels may be identified that have reflective values similar to a reflective value that corresponds to the particular pixel (having the missing depth value). A median depth value may be determined based on valid depth values of the set of pixels and the missing depth value of the particular pixel may be set as the median depth value. Accordingly, as illustrated in the modified depth map image 240, the missing depth values have been populated. For example, the missing depth values for the missing finger may be populated (e.g., filled in). Additionally, based on the error identification and depth value modification techniques described above, finer details of the face, such as the nose, the mouth, and the ears have been achieved in the modified depth map image 240 as compared to the depth map image 210.

Figure 3:
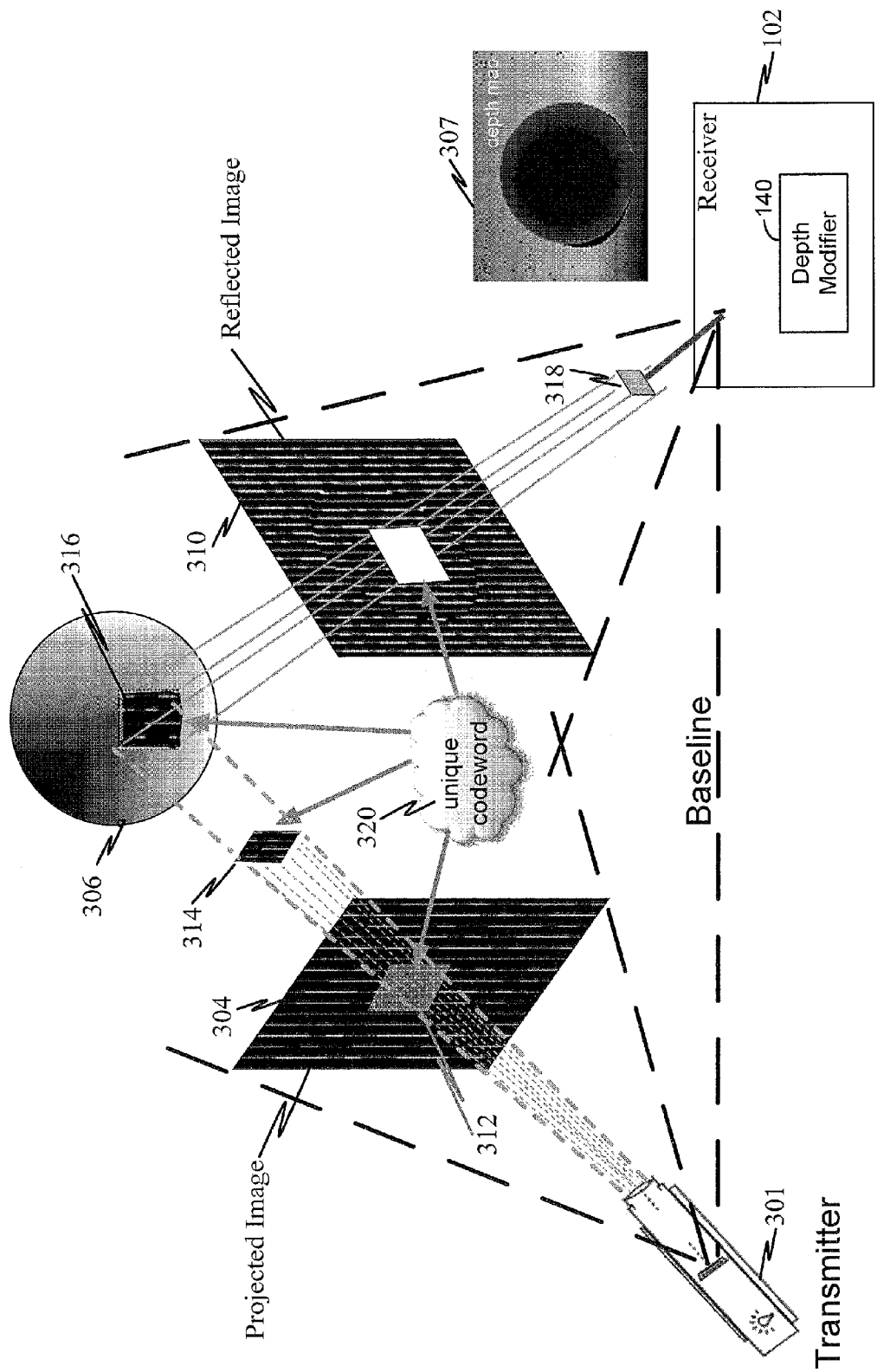
FIG. 3 is a block diagram of an illustrative structured light system.

Referring to FIG. 3, a structured light system 300 is depicted. The structured light system 300 may use a known pattern to illuminate a scene or an object and to obtain depth information with which to generate 3-dimensional (3D) information from 2-dimensional (2D) images and/or 2D information. The structured light system 300 may include a transmitter device 301 and the receiver device 102.

The transmitter device 301 may be configured to project a light field through a code mask 304 (e.g., an image with codes) to project one or more codewords on an object 306 (and/or a scene). For example, an encoder/shape modulator included in the transmitter may be configured to generate the code mask 304 which is then projected by the transmitter device 301 over a transmission channel (e.g., where the channel includes the path and/or trajectory through which the composite code mask is to be projected). The code mask 304 may be projected onto the object 306 (e.g., a target).

The receiver device 102 may be configured to capture a projected code mask 310 and the one or more codewords therein. For example, a receiver sensor coupled to or included in the receiver device 102 may be configured to capture light reflected off of the object 306, such as capturing an image of the object 306. A shape and/or a depth of the object 306 (e.g., the target) may be "encoded" in the image. For example, a shift (e.g., a displacement) of a particular codeword from a projected code mask to a captured reflection of the projected code mask may be representative of (e.g., encode) a depth value of the object that reflected the projected code mask. To illustrate, a projected code mask 310 (e.g., a reflection of the code mask 304 off of the object 306) captured in the image may be used by the receiver device 102 to determine the shape and/or the depth of the object 306. The receiver device 102 may "decode" the captured image (e.g., image data, such as the image data 110 of FIG. 1) to obtain a depth map 307 (e.g., depth data, such as the depth information 122a of FIG. 1), as described further with reference to FIG. 4. The depth map 307 may be used, such as by an application included in the receiver device 102, to generate, present, and/or provide a 3D version (e.g., a 3D image) of the object 306 (e.g., the target). The receiver device 102 may include the depth modifier 140 to correct depth map data errors, such as errors resulting from false positives, false negatives, and/or decoding errors. For example, the depth modifier 140 may modify the depth map 307 to generate a modified depth map.

As depicted in FIG. 3, a section/portion/window 312 of the code mask 304 is projected (as section/portion/window 314) onto a surface (e.g., projected section/portion/window 316) of the object 306. The projected section/portion/window 316 may then be captured by the receiver device 102 as a captured segment 318. The section/portion/window 312 may be used as a codeword that can be uniquely identified.

Thus, by covering the object 306 (and/or the scene) with one or more unique codewords in this manner, sections/portions of the object 306 (and/or the scene) may be identified/tagged and the one or more unique codewords may be used for depth sensing by the receiver device 102.

From the image captured by the receiver device 102, multiple segments (e.g., multiple codewords) may be identified over the object 306 (or the scene). Each segment 318 may be uniquely identifiable at the receiver device 102 and a location of a particular segment relative to other segments may be ascertained from the known pattern of the code mask 304. The identification of a code (e.g., a codeword) from each segment/portion/window may involve pattern segmentation (e.g., to address distortion) and decoding of the perceived segment/portion/window into a corresponding code(s). Additionally, triangulation may be applied over each captured segment/portion/window to ascertain an orientation and/or depth. Multiple such segments/portions/windows may be combined to stitch together a captured image pattern. In this manner, a map of depth (e.g., a depth map, such as the depth information 122a of FIG. 1) may be generated for the object 306 (or the scene).

Figure 4:
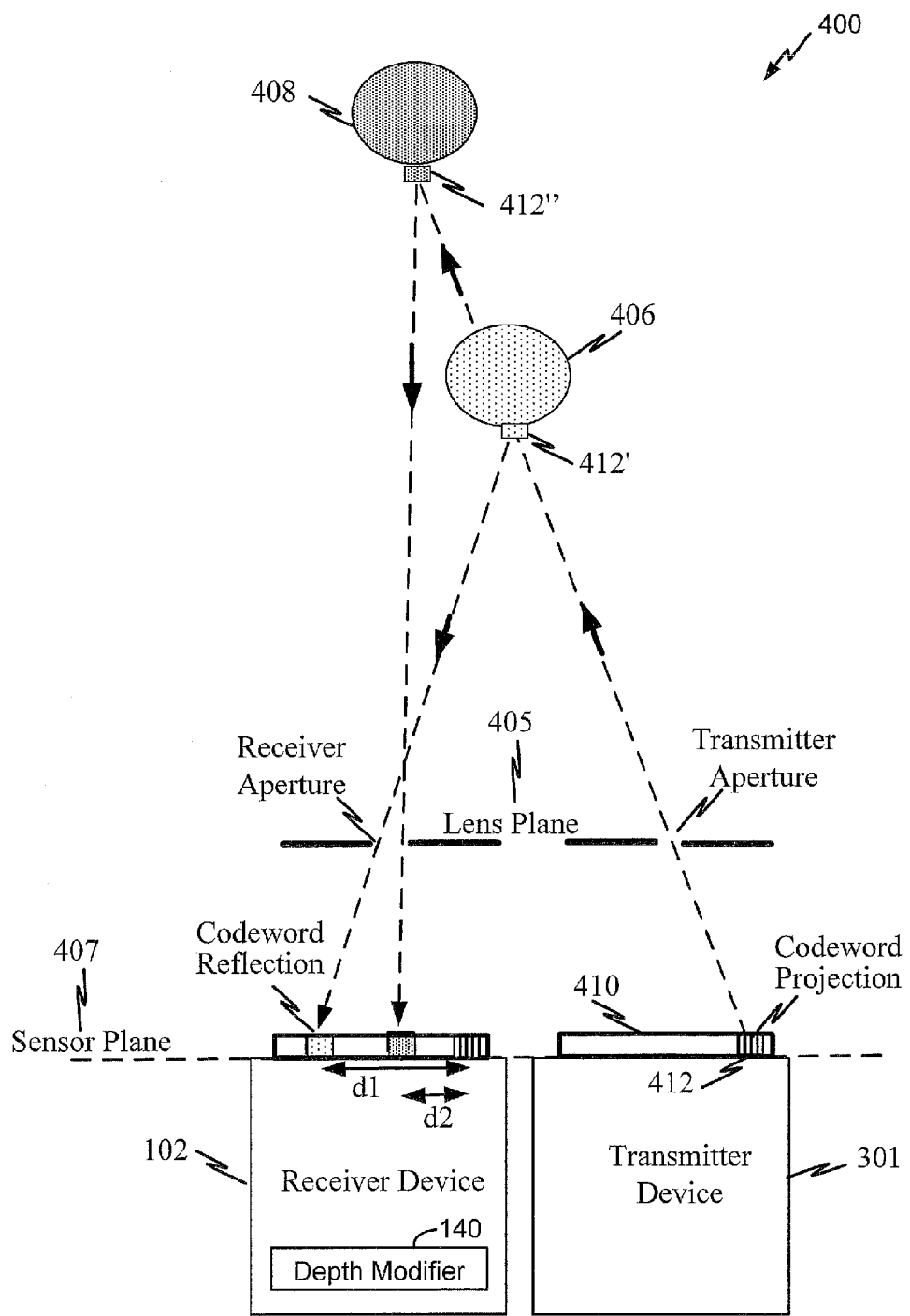
FIG. 4 is a diagram of an illustration of sensing depth based on an object or a scene.

Referring to FIG. 4, an example of how depth (e.g., depth data) may be sensed for an object or a scene is depicted and generally designated 400. The transmitter device 301 may be positioned on the same baseline reference plane (e.g., lens plane 405) as the receiver device 102. The transmitter device 301 and/or the receiver device 102 may be included in or correspond to the structured light system 100 of FIG. 1 and/or the structured light system 300 of FIG. 3.

The transmitter device 301 may project a code mask 410 onto a scene or an object through an aperture or lens. For example, the transmitter device 301 may use various types of modulation and coding schemes may be used to generate the code mask 410. These modulation and coding schemes may include temporal coding, spatial coding, and direct codification, as illustrative, non-limiting examples. The code mask 410 may include or correspond to the code mask 304 of FIG. 3. For purposes of illustration, a projected segment/portion/window 412 (representing a codeword) is shown as part of a transmitted code mask 410. This code segment/portion/window 412 may be projected on a first scene (e.g., a first object 406) at a first distance from the transmitter device 301 and/or may be projected on a second scene (e.g., a second object 408) at a second distance from the transmitter device 301. The first object 406 or the second object 408 may include or correspond to the object 306 of FIG. 3.

A sensor (e.g., a camera) included in or coupled to the receiver device 102 may capture an image of the projected code mask 410 (e.g., a received code mask 411) through a receiver aperture, such as a reflection of the projected code mask 410 off of one or more objects. For purposes of illustration, the transmitted code mask 310 is shown on the same sensor plane 407 as the received code mask 411. The image captured by the sensor may be converted into (e.g., represented as) image data, such as the image data 110 of FIG. 1, and provided to the receiver device 102. The image data may include or correspond to pixel intensity values associated with the image. The receiver device 102 may include the depth modifier 140 to correct depth map data errors included in a depth map generated by the receiver device 102, such as errors resulting from false positives, false negatives, and/or decoding errors.

When the first object 406 is located closer (relative to the second object 408) to the transmitter device 301 (e.g., a first distance from the transmitter device 301), a reflection of projected segment 412 appears at a distance d1 from its initial location as transmitted by the transmitter device 301. When the second object 408 is located farther away (relative to the first object 406) from the transmitter device 301 (e.g., a second distance from the transmitter device), a reflection of the projected segment/portion/window 412 appears at a distance d2 from its initial location as transmitted by the transmitter device (where d2<d1). Accordingly, the farther away an object is from the transmitter/receiver, the closer the received projected segment/portion/window is from its original position at the receiver device 102 (e.g., the outgoing projection and incoming projection are more parallel). Conversely, the closer an object is from the transmitter/receiver, the farther the received projected segment/portion/window is from its original position at the receiver device 102. Thus, the difference between the received codeword position and transmitted codeword position may be used to determine a depth (e.g., a depth value) of a particular object. For example, the depth (e.g., relative depth) may provide a depth value for each pixel or subset of grouped pixels (e.g., regions of two or more pixels) associated with the image. Accordingly, depth information (e.g., a depth value) corresponding to a pixel of the image that receives a reflected codeword may be determined based on a displacement of the reflected codeword relative to a position of the codeword in a projected code mask.

Figure 5:
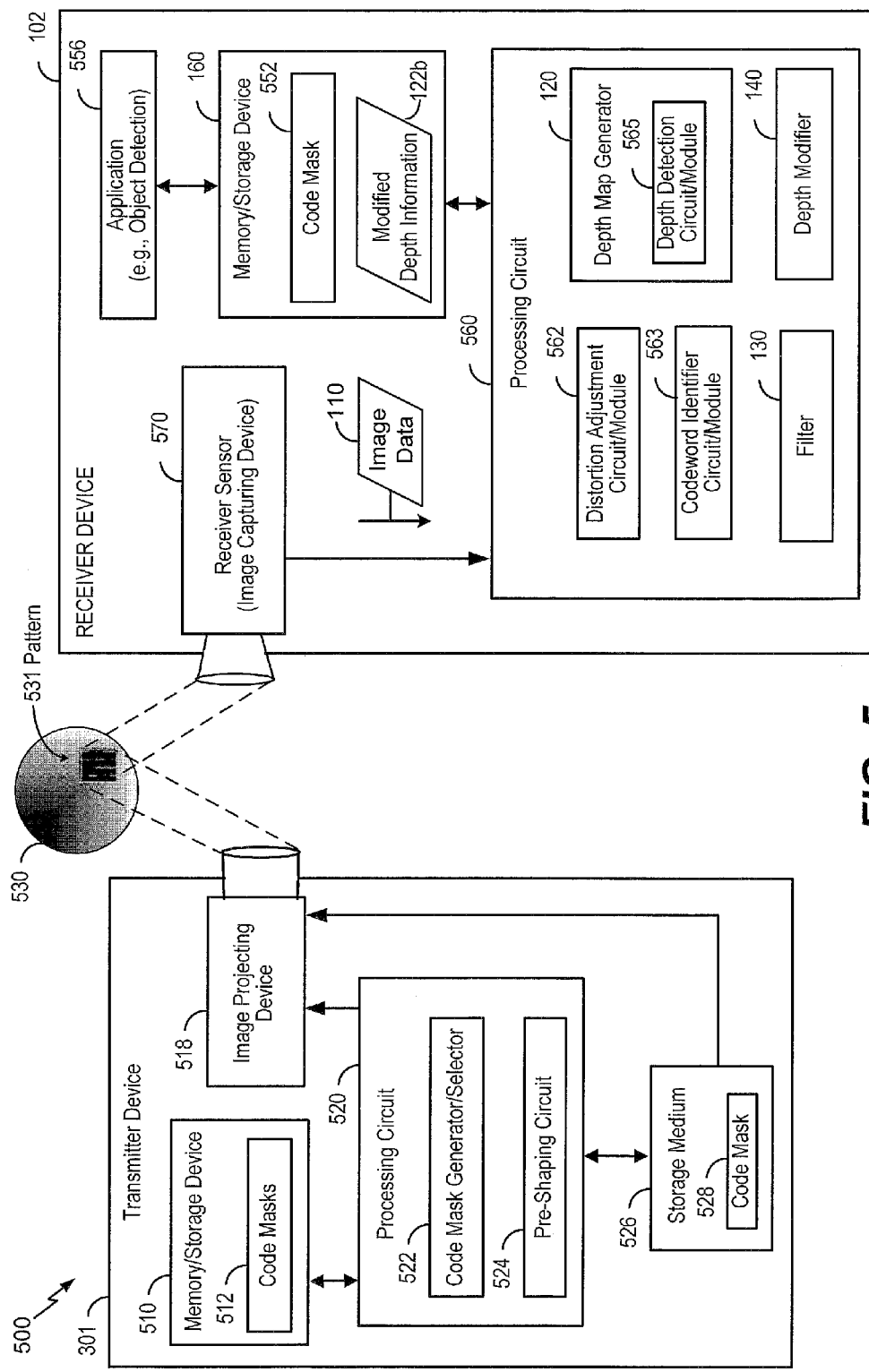
FIG. 5 is a block diagram of an illustrative structured light system configured to generate a depth map.

Referring to FIG. 5, another example of a structured light system is depicted and generally designated 500. The structured light system 500 includes the transmitter device 301 and the receiver device 102. The structured light system 500 may include or correspond to the structured light system 100 of FIG. 1 and/or the structured light system 300 of FIG. 3.

The transmitter device 301 may be configured to generate a code mask (e.g., a pattern of structured light) and/or to project the code mask. The code mask may include or correspond to one or more codewords. For example, the code mask may include the code mask 304 of FIG. 3 or the code mask 410 of FIG. 4. The transmitter device 301 may include a processing circuit 520 coupled to a memory/storage device 510, an image projecting device 518, and/or a storage medium 526.

The processing circuit 520 may include a code mask generator/selector 522 and/or a pre-shaping circuit 524. The code mask generator/selector 522 may be configured to select one or more pre-stored code masks 512 stored at the memory/storage device 510. For example, the code mask generator/selector 522 may select a particular code mask, such as the code mask 528, from the one or more pre-stored code masks 512. The processing circuit 520 may send the selected code mask (e.g., the code mask 528) to be stored at the storage medium 526. The pre-shaping circuit 524 may be configured to pre-shape the selected particular code mask to compensate for expected distortion in a channel through which the code mask 528 is to be projected (e.g., where the channel includes the path and/or trajectory through which the composite code mask is to be projected). The pre-shaping circuit 524 may pre-shape the code mask 528 prior to storage of the code mask 528 at the storage medium 526 or after storage at the storage medium 526 but prior to the code mask 528 being provided to the image projecting device 518.

The storage medium 526 may store the code mask 528. The code mask 528 may include one or more codewords defined by a plurality of symbols, such as one or more uniquely identifiable spatially-coded codewords (e.g., uniquely identifiable patterns of structured light). The code mask 528 may be pre-shaped (e.g., by the pre-shaping circuit 524) by a synthetic point spread function prior to projection.

Although the storage medium 526 is illustrated as including a single code mask, the storage medium 526 may include multiple code masks. Although the memory/storage device 510 and the storage medium 526 are illustrated as distinct components, in other implementations, the memory/storage device 510 and the storage medium 526 may include a single memory component.

The image projecting device 518 may be configured to project the selected particular code mask (e.g., the code mask 528) onto an object of interest, such as the object 530. For example, the image projecting device 518 may project the code mask 528 onto the object 530 as a pattern 531 of structured light. The image projecting device 518 may include a laser or another light source to project the selected particular code mask onto the object of interest (e.g., through a projection channel). For example, the code mask 528 may be projected in an infrared spectrum, so that the code mask 528 is invisible to the naked eye.

The receiver device 102 may be configured to be configured to obtain depth information, such as the depth information 122a of FIG. 1, from a received "reflected" code mask and to generate modified depth information 122b. The receiver device 102 may include a processing circuit 560 coupled to a memory/storage device 160 and to a receiver sensor 570 (e.g., an image capturing device). The receiver device 102 may also include or be coupled to an application, such as an object detection application.

The receiver sensor 570 (e.g., camera, etc.) may be configured to obtain (e.g., detect) at least a portion of a code mask projected on a surface of the object 530. For instance, the receiver sensor 570 may capture an image that includes the pattern 531 of structured light projected onto (e.g., reflected off of) the object 530. Based on the captured image, the receiver sensor 570 may generate and output the image data 110 (e.g., pixel intensity values) that corresponds to the image. In some implementations, the receiver sensor 570 may be configured to capture the image (e.g., the reflected code mask) in the infrared spectrum.

The processing circuit 560 may include a distortion adjustment circuit/module 562, a codeword identifier circuit/module 563, the filter 130, the depth map generator 120, and/or the depth modifier 140. The distortion adjustment circuit/module 562 may be configured to adjust the image data 110 to correct a distortion (e.g., a skew) of the portion of the code mask detected by the receiver sensor 570. The codeword identifier circuit/module 563 may be configured to detect a codeword from a group of data values included in the image data (e.g., the group of data values corresponding to a window defined within the portion of the code mask detected by the receiver sensor 570).

The depth map generator 120 may be configured to receive the adjusted image data 110 from the distortion adjustment circuit/module 562 and the codeword detected by the codeword identifier circuit/module 563. The depth map generator 120 may include a depth detection circuit/module 565 configured to determine depth information for a surface portion of the object 530 corresponding to the group of data values (e.g., the window). For example, the depth detection circuit/module 565 may determine a displacement of position of a detected codeword in the captured image relative to an expected position of the codeword based on a known reference code mask 552, such as a code mask used and projected by the transmitter device 301. The reference code mask 552 may be stored at the memory/storage device 160 of the receiver device 102. The depth map generator 120 may be configured to generate a depth map that includes depth information for the captured image. For example, the depth information may include particular depth information for the object 530. The depth information, such as the depth information 122a of FIG. 1, may be provided from the depth map generate 120 to the depth modifier 140.

The filter 130 may process the image data 110 to generate filtered image data, such as the filtered image data 132 of FIG. 1. For example, the filter 130 may include or correspond to a blurring filter, a total variation filter, or a combination thereof The filtered image data may be associated with regions (or objects) within the image that have similar reflectivity.

The depth modifier 140 may be configured to receive the depth information from the depth map generator 120 and to receive the filtered image data from the filter 130. The depth modifier 140 may be configured to identify incorrect depth data included in the depth information and to correct the incorrect depth data to generate the modified depth information 122b. The depth modifier 140 may provide the modified depth information 122b to the memory/storage device 160.

The memory/storage device 160 may store one or more code masks, such as a representative code mask 552, and the modified depth information 122b generated by the depth modifier 140. The code mask 552 may correspond to (e.g., be the same as) one of the code masks 512 stored at the memory/storage device 510 of the transmitter device 301.

The application 556, such as an object detection application, may be configured to access the modified depth information 122b stored at the memory/storage device 160 of the receiver device 102. For example, the application 556 may be configured to detect one or more objects included in the image captured by the receiver sensor 570. To illustrate, the application 556 may include a finger detection application to identify a number of fingers extended on a hand included in the image. Alternatively, or in addition, the application 556 may include a gesture detection application to identify one or more gestures based on modified depth information corresponding to a sequence of images processed by the receiver device.

Figure 6:
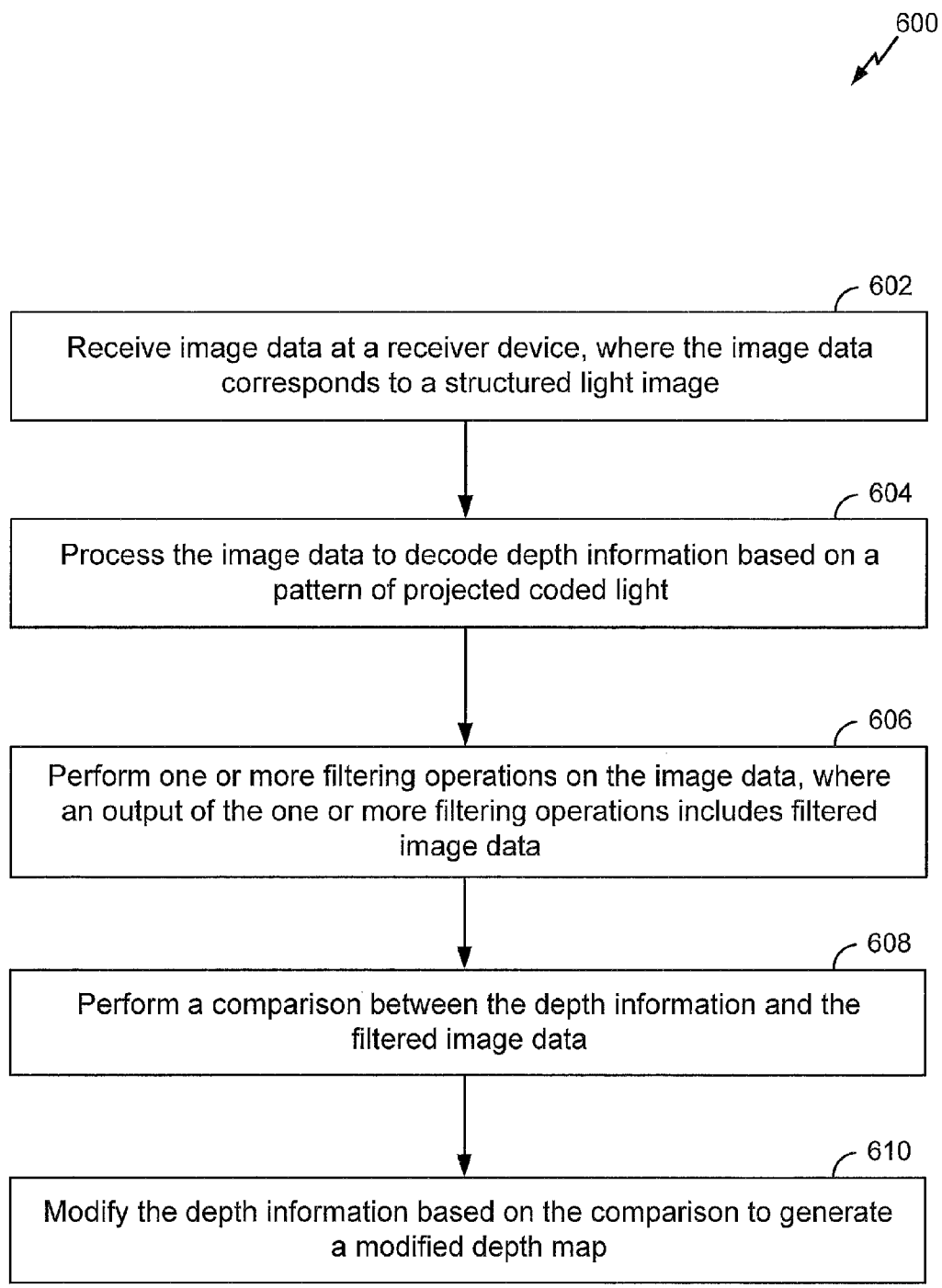
FIG. 6 is a flow diagram of a first illustrative example of a method of modifying depth information.

Referring to FIG. 6, a flow diagram of a first illustrative example of a method 600 of modifying depth information is depicted. The method 600 may be performed by the receiver device 102 of FIG. 1, 3, 4, or 5 and/or the processing circuit 360 of FIG. 3.

The method 600 includes receiving image data at a receiver device, where the image data corresponds to a structured light image, at 602. For example, image data 110 may be received by the receiver device 102 of FIG. 1. The method 600 further includes processing the image data to decode depth information based on a pattern of projected coded light, at 604. The depth information may correspond to a depth map. As an example, the image data 110 may be processed by the depth map generator 120 to produce the depth information 122a. The method 600 further includes performing one or more filtering operations on the image data, where an output of the one or more filtering operations includes filtered image data, at 606. For example, the image data 110 may be processed by the filter 130 to generate the filtered image data, such as the filtered image data 132, as described with respect to FIG. 1. The method 600 may include performing a comparison between the depth information and the filtered image data, at 608. The method 600 further includes modifying the depth information based on the comparison to generate a modified depth map, at 610. For example, the depth information 122a may be modified based on the filtered image data 132 by the depth modifier 140 to produce the modified depth information 122b.

In a particular illustrative implementation, the image data is received from an image capture sensor that is configured to capture the image. For example, the image data 110 may be received by the receiver device 102 from an image capture sensor, such as a sensor within a camera. The image data may include pixel intensity values, and the image data may be associated with a reflected image that is produced by transmitting projected coded light via a filter that is associated with a code mask. For example, the transmitter device 301 may transmit projected coded light via a filter, such as via the codeword projection 412, to an image that is reflected to the receiver device 102, as in FIG. 4.

The image data may be processed by decoding the depth information including identifying a codeword based on the image data and determining a displacement of the codeword from a location of the codeword in a projected code mask to a location of the codeword in the image, where the image corresponds to a reflection of the projected code mask. Depth data may be generated based on the displacement.

In a particular implementation, processing the image data to generate the filtered image data includes applying a blurring filter, a total variation filter, a low pass filter, a band pass filter, or a combination thereof, to filter the image data to generate the filtered image data. For example, the filter 130 may be a blurring filter, a total variation filter, or a combination thereof The filter 130 may filter the image data 110 to generate the filtered image data 132. The method of processing the image data may further include performing a comparison between the depth information and the filtered image data. For example, the comparison may correspond to performing a pixel by pixel comparison between the depth information and the filtered image data.

Figure 7:
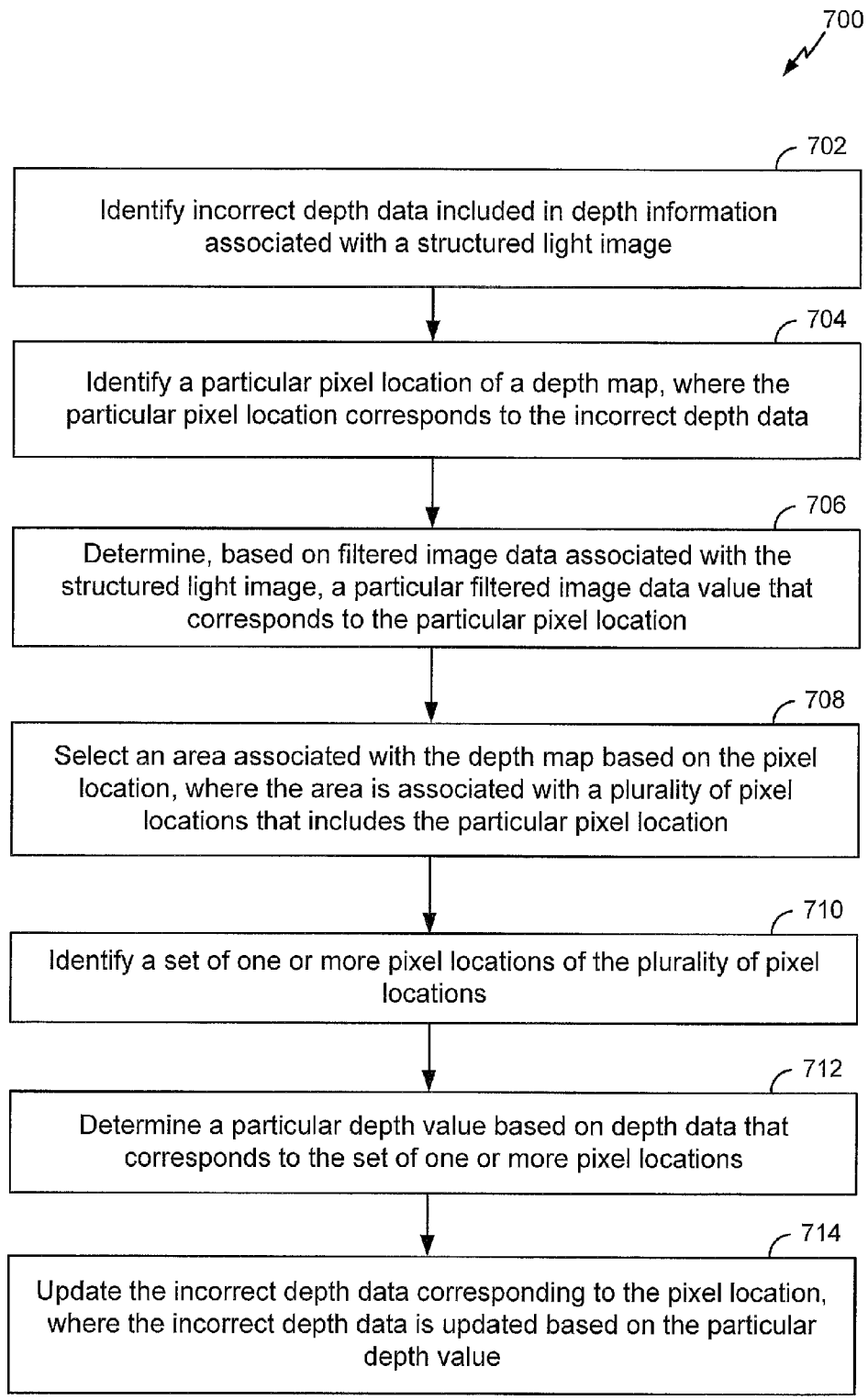
FIG. 7 is a flow diagram of a second illustrative example of a method of modifying depth information.

Referring to FIG. 7, a flow diagram of a second illustrative example of a method 700 of modifying depth information is depicted. The method 700 may be performed by the receiver device 102 of FIG. 1, 3, 4, or 5 and/or the processing circuit 360 of FIG. 3. In some implementations, the method 700 may include or correspond to modifying the depth information based on the filtered image data, at 608 of the method 600 of FIG. 6.

The method 700 may include identifying an incorrect depth value included in the depth information associated with a structured light image, at 702. Modifying the depth information may include correcting the incorrect depth value included in the depth information. Alternatively, processing the depth information may include identifying, based on the comparison, a missing depth value associated with the depth information. Thus, either missing depth information or incorrect depth information may be corrected to produce modified depth information with improved accuracy. The incorrect depth data included in the depth information may correspond to one or more pixels associated with a depth map and modifying the depth information may include correcting the incorrect depth data in the depth map.

The method 700 may include identifying a particular pixel location of the depth map, where the particular pixel location corresponds to the incorrect depth data, at 704, and determining, based on the filtered image data, a particular filtered image data value that corresponds to the particular pixel location, at 706. For example, the comparison logic 150 within the depth modifier 140 may compare the depth information 122*a* and the filtered image data 132 as described with respect to FIG. 1.

The method 700 may further include selecting an area associated with the depth map based on the particular pixel location, where the area is associated with a plurality of pixel locations that includes the particular pixel location, at 708, and identifying a set of one or more pixel locations of the plurality of pixel locations, at 710. In addition, the method 700 may include determining a particular depth value based on depth data that corresponds to the set of one or more pixel locations, at 712, and updating the incorrect depth data corresponding to the particular pixel location, at 714. The incorrect depth data may be updated based on the particular depth value to produce updated depth data.

The methods of FIGS. 6-7 may be implemented by a field-programmable gate array (FPGA) device, an application-specific integrated circuit (ASIC), a processing unit such as a graphical processing unit (GPU), a central processing unit (CPU), a digital signal processor (DSP), a controller, another hardware device, firmware device, or any combination thereof As an example, the methods of FIG. 6-7 can be performed by one or more processors that execute instructions to modify depth information.

Figure 8:
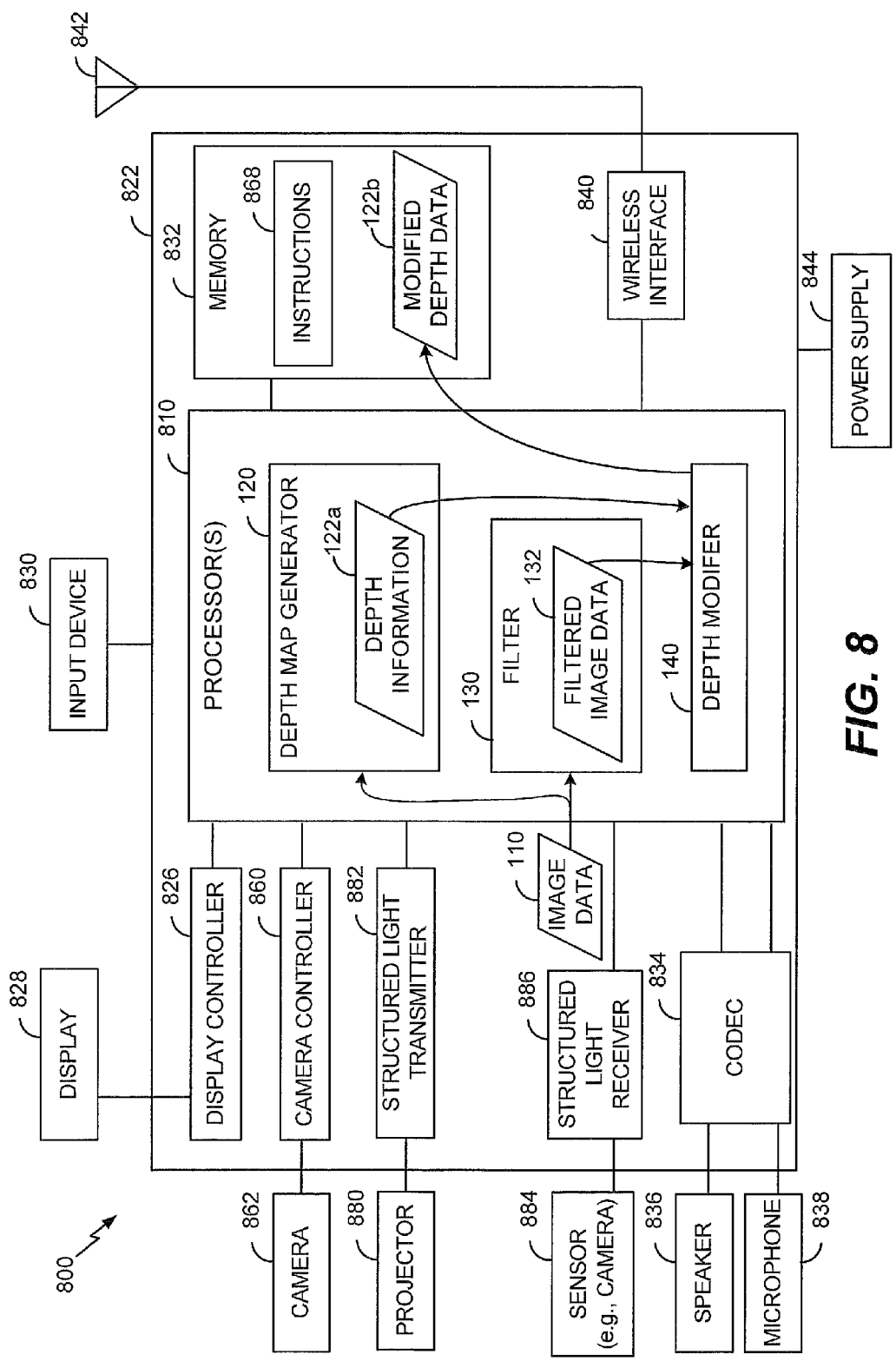
FIG. 8 is a block diagram of a device for processing image data to detect and/or track a line segment included in an image using the system of FIG. 1.

Referring to FIG. 8, a block diagram of a particular illustrative example of a wireless communication device 800 is depicted. The device 800 may include one or more components of the structured light system 100 of FIG. 1, the structured light system 300 of FIG. 3, the structured light system 400 of FIG. 4, the structured light system 500 of FIG. 5, or a combination thereof.

The device 800 includes one or more processors 810 (e.g., one or more processing cores), such as a digital signal processor (DSP), a graphical processing unit (GPU), and/or a central processing unit (CPU). The one or more processors 810 may be coupled to a memory 832. The memory 832 includes instructions 868 (e.g., executable instructions), such as computer-readable instructions or processor-readable instructions. The instructions 868 may include one or more instructions that are executable by a computer, such as by each of the one or more processors 810.

For example, the one or more instructions may be executable by the one or more processors 810 to cause the one or more processors 810 to perform operations including processing image data corresponding to an image to decode depth information based on a pattern of projected coded light. To illustrate, the device 800 may include a structured light receiver 886 coupled to a sensor 884 that captures image(s) of patterns of projected coded light. The structured light receiver 886 may generate the image data 110 based on an output of the sensor 884. The one or more processors 810 may include the depth map generator 120, which decodes/generates the depth information 122*a* based on the image data 110. In some implementations, the pattern of projected coded light is projected by a projector 880 that is coupled to a structured light transmitter 882. Thus, in some implementations, the device 800 may be configured to act as both a transmitter device and a receiver device of a structured light system.

The operations may also include processing the image data to generate filtered image data, where the filtered image data is associated with regions of the image that have similar reflectivity. For example, the one or more processors 810 may include the filter 130, which processes the image data 110 to generate the filtered image data 132. The operations may further include modifying the depth information based on the filtered image data. For example, the one or more processors 810 may include the depth modifier 140, which may modify the depth information 122*a* to generate the modified depth information 122*b*.

FIG. 8 also shows a display controller 826 that is coupled to the one or more processors 810 and to a display 828. A coder/decoder (CODEC) 834 can also be coupled to the one or more processors 810. A speaker 836 and a microphone 838 can be coupled to the CODEC 834. The one or more processors 810 may also be coupled to a camera controller 860 that is coupled to a camera 862. In some implementations, the device 800 includes a single image capture device (e.g., the camera 862 includes the sensor 884).

FIG. 8 also indicates that a wireless interface 840, such as a wireless controller, can be coupled to the one or more processors 810 and to an antenna 842. In some implementations, the one or more processors 810, the display controller 826, the camera controller 860, the memory 832, the CODEC 834, the projector 880, the sensor 884, and the wireless interface 840 are included in a system-in-package or system-on-chip device 822. In other implementations, an input device 830 and a power supply 844 are coupled to the system-on-chip device 822. Moreover, as illustrated in FIG. 8, the display 828, the input device 830, the speaker 836, the microphone 838, the antenna 842, the camera 862, the projector 880, the sensor 884, and the power supply 844 are external to the system-on-chip device 822. However, each of the display 828, the camera 862, the projector 880, the sensor 884, the input device 830, the speaker 836, the microphone 838, the antenna 842, and the power supply 844 can be coupled to a component of the system-on-chip device 822, such as an interface, a controller, a transmitter (e.g., transmitter circuitry), or a receiver (e.g., receiver circuitry).

One or more of the disclosed aspects may be implemented in a system or an apparatus, such as the device 800, that may include a communications device, a fixed location data unit, a mobile location data unit, a mobile phone, a cellular phone, a satellite phone, a computer, a tablet, a portable computer, or a desktop computer. Alternatively or additionally, the device 800 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Aspects of the disclosure may be suitably employed in any device that includes integrated circuitry including memory, a processor, and on-chip circuitry. Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. Accordingly, no single example described herein should be construed as limiting and aspects of the disclosure may be suitably combined without departing form the teachings of the disclosure.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal In the alternative, the processor and the storage medium may reside as discrete components in a computing device or user terminal.

The previous description is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method comprising:
receiving image data at a receiver device, wherein the image data corresponds to a structured light image;
generating depth value data by processing the image data to decode depth information based on a pattern of projected coded light, wherein the depth value data corresponds to a depth map;
performing one or more filtering operations on the image data, wherein an output of the one or more filtering operations includes filtered image data;
performing a comparison between the depth value data and the filtered image data; and
modifying at least one depth value of the depth value data based on the comparison to generate a modified depth map.

2. The method of claim 1, wherein the one or more filtering operations modify the image data to identify regions within the structured light image that have similar reflectivity.

3. The method of claim 1, wherein the filtered image data is generated without determining an edge between two adjacent regions having differing reflectivity.

4. The method of claim 1, wherein the filtered image data corresponds to a filtered structured light image.

5. The method of claim 4, wherein the filtered structured light image is a segmentation map image.

6. The method of claim 1, further comprising identifying, based on the comparison, an incorrect depth value in the depth value data.

7. The method of claim 1, wherein processing the image data to decode the depth information comprises:
identifying a codeword based on the image data; and
determining a displacement of the codeword from a first location of the codeword in a projected code mask to a second location of the codeword in the structured light image, wherein the structured light image corresponds to a reflection of the projected code mask;
and generating depth data based on the displacement.

8. The method of claim 1, wherein performing the one or more filtering operations comprises applying a blurring filter, a total variation filter, a low pass filter, or a combination thereof, to filter the image data to generate the filtered image data.

9. The method of claim 1, wherein the comparison corresponds to a pixel by pixel comparison between the depth value data and the filtered image data.

10. The method of claim 9, further comprising identifying, based on the comparison, an incorrect depth value included in the depth value data, wherein modifying includes correcting the incorrect depth value included in the depth value data.

11. The method of claim 9, further comprising identifying, based on the comparison, a missing depth value associated with the depth value data, wherein modifying includes populating the missing depth value to be included in the depth value data.

12. The method of claim 1, further comprising:
identifying a particular pixel location of the depth map, wherein the particular pixel location corresponds to incorrect depth data included in the depth value data; and
determining, based on the filtered image data, a particular filtered data value of the filtered image data that corresponds to the particular pixel location, wherein modifying the at least one depth value of the depth value data includes modifying the incorrect depth data based on the particular filtered data value.

13. The method of claim 12, further comprising:
selecting an area associated with the depth map based on the particular pixel location, wherein the area is associated with a plurality of pixel locations that includes the particular pixel location; and
identifying a set of one or more pixel locations of the plurality of pixel locations, where each pixel associated with the set of one or more pixel locations corresponds to a filtered data value of the filtered image data that is similar to the particular filtered data value.

14. The method of claim 13, further comprising:
determining a particular depth value based on depth value data that corresponds to the set of one or more pixel locations; and
updating the incorrect depth data corresponding to the particular pixel location, wherein the incorrect depth data is updated based on the particular depth value.

15. A device comprising:
a processor configured to process image data that corresponds to a structured light image to decode depth information based on a pattern of projected coded light and to perform a filtering operation on the image data to generate filtered image data, the processor further configured to modify, based on a comparison between the depth information and the filtered image data, at least one depth value included in the depth information to generate modified depth information; and
a memory configured to store the modified depth information.

16. The device of claim 15, wherein the device includes camera configured to capture the structured light image and to generate the image data.

17. The device of claim 15, wherein the depth information includes depth value data and corresponds to a depth map associated with the structured light image, and wherein the pattern of projected coded light is associated with a code mask.

18. The device of claim 15, wherein the image data corresponds to a plurality of pixels, and wherein, for each pixel of the plurality of pixels, the image data includes a corresponding pixel intensity value.

19. The device of claim 18, wherein, for each pixel of the plurality of pixels, the depth information includes a corresponding depth value and the filtered image data includes a corresponding intensity value.

20. The device of claim 15, wherein the processor is further configured to perform the comparison between depth values of the depth information and the filtered image data, and wherein the comparison includes a pixel by pixel comparison between the depth information and the filtered image data.

21. The device of claim 20, wherein the processor is further configured to identify, based on the comparison, an incorrect depth value, a missing depth value, or a combination thereof.

22. An apparatus comprising:
means for decoding depth information based on image data that corresponds to a structured light image and based on a pattern of projected coded light;
means for performing one or more filtering operations on the image data to generate filtered image data; and
means for modifying at least one depth value included in the depth information based on a comparison between the depth information and the filtered image data.

23. The apparatus of claim 22, further comprising means for capturing the structured light image.

24. The apparatus of claim 22, wherein the at least one depth value is modified to correct incorrect depth data of the depth information, and wherein the incorrect depth data includes an incorrect depth value or a missing depth value.

25. A non-transitory computer-readable medium storing instructions that are executable by a processor to cause the processor to perform operations comprising:
processing image data corresponding to a structured light image to decode depth information based on a pattern of projected coded light, wherein the depth information corresponds to a depth map;
performing one or more filtering operations on the image data to generate filtered image data; and
modifying at least one depth value included in the depth information based on a comparison between the depth information and the filtered image data.

26. The non-transitory computer-readable medium of claim 25, wherein the image data is received from an image capture sensor that is configured to capture the structured light image.

27. The non-transitory computer-readable medium of claim 25, wherein performing the one or more filtering operations comprises performing a blurring filtering operation, a total variation filtering operation, or a combination thereof.

28. The non-transitory computer-readable medium of claim 25, wherein the instructions are further executable by the processor to cause the processor to perform the operations further comprising identifying, based on the comparison, an incorrect depth value included in the depth information, and wherein modifying includes correcting the incorrect depth value included in the depth information.

29. The non-transitory computer-readable medium of claim 25, wherein the instructions are further executable by the processor to cause the processor to perform the operations further comprising identifying, based on the comparison, a missing depth value associated with the depth information, and wherein modifying includes populating the missing depth value to be included in the depth information.

30. The non-transitory computer-readable medium of claim 25, wherein performing the one or more filtering operations comprises performing a low pass filtering operation, a band pass filtering operation, or a combination thereof.

* * * * *